US011892171B2

(12) United States Patent
Lee

(10) Patent No.: US 11,892,171 B2
(45) Date of Patent: Feb. 6, 2024

(54) COOKING APPLIANCE WITH ELEVATING PLATFORM

(71) Applicant: Haier US Appliance Solutions, Inc., Wilmington, DE (US)

(72) Inventor: Byung Cheon Lee, Seongnam (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 316 days.

(21) Appl. No.: 17/197,340

(22) Filed: Mar. 10, 2021

(65) Prior Publication Data

US 2022/0290869 A1 Sep. 15, 2022

(51) Int. Cl.
*F24C 15/16* (2006.01)
*B66F 7/06* (2006.01)

(52) U.S. Cl.
CPC .............. *F24C 15/16* (2013.01); *B66F 7/065* (2013.01)

(58) Field of Classification Search
None
See application file for complete search history.

(56) References Cited

U.S. PATENT DOCUMENTS 3,989,916 A * 11/1976 Amagami .............. H05B 6/065 219/622
4,114,009 A * 9/1978 Kiuchi ................. H05B 6/1245 219/625
4,549,720 A * 10/1985 Bergenwall ............... B66F 7/08 187/269
5,429,210 A * 7/1995 Hansen ..................... B66F 7/08 187/269
5,938,959 A * 8/1999 Wang .................. A47J 37/0629 219/403
2005/0139592 A1* 6/2005 Kim ..................... H05B 6/6411 219/680
2014/0131345 A1 5/2014 Cadima
2015/0040554 A1* 2/2015 Smith ..................... F03C 1/002 60/449
2017/0174486 A1* 6/2017 Kochie ..................... B66F 7/08
2021/0235555 A1* 7/2021 Lim ..................... H05B 6/6411
2021/0267026 A1* 8/2021 Kim ..................... H05B 6/6488
2022/0095423 A1* 3/2022 Shin ......................... H05B 6/80

FOREIGN PATENT DOCUMENTS

CN 107726382 A 2/2018
CN 110631062 B * 11/2020
DE 3604456 A1 * 8/1987
EP 3048861 A1 * 7/2016 ............... H05B 6/12
EP 3048861 A1 7/2016
KR 20200080901 A * 7/2020
WO WO2007055132 A1 5/2007

* cited by examiner

*Primary Examiner* — Jorge A Pereiro
(74) *Attorney, Agent, or Firm* — Dority & Manning, P.A.

(57) ABSTRACT

A cooking appliance includes a cabinet that defines a vertical direction and an inner shell positioned within the cabinet. The inner shell defines a cooking chamber therein. The cooking appliance also includes an upper heating module positioned at or proximate to an upper wall of the inner shell. The cooking appliance further includes a movable platform mounted to the inner shell within the cabinet. The movable platform is configured to move along the vertical direction between a bottom position wherein the movable platform is at least partially flush with a bottom wall of the inner shell and an elevated position wherein the movable platform is positioned above the bottom wall of the inner shell.

16 Claims, 8 Drawing Sheets

COOKING APPLIANCE WITH ELEVATING PLATFORM

FIELD OF THE INVENTION

The present subject matter relates generally to cooking appliances, and more particularly to cooking appliances having features for moving food items therein closer to heating elements of the cooking appliance.

BACKGROUND OF THE INVENTION

Various cooking appliances include a cooking chamber defined inside of the appliance with multiple heat sources positioned in or proximate to the cooking chamber for providing heat to the cooking chamber and food items therein. The heat sources may include one or more of electrical resistance heating elements, heat lamps, a microwave energy source such as a magnetron, and/or an induction heating system. The multiple heat sources are typically spaced apart from each other within the cooking appliance. For example, one heat source may be an upper heat source positioned at or proximate to a top of the cooking chamber, and another heat source may be a lower heat source positioned at or proximate to a bottom of the cooking chamber.

However, in some instances, and in particular when heating relatively small portions or amounts of food, the food items may be positioned away from one of the heat sources such that heat energy from the heat source takes too long to reach the food, and a significant portion of the heat energy may be lost or dissipated before reaching the food, resulting in longer cooking times and less efficient energy use.

As a result, it would be advantageous to provide a cooking appliance with features for moving food items therein closer to heating elements of the cooking appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking appliance is provided. The cooking appliance includes a cabinet that defines a vertical direction and an inner shell positioned within the cabinet. The inner shell defines a cooking chamber therein. The cooking appliance also includes an upper heating module positioned at or proximate to an upper wall of the inner shell. The cooking appliance further includes a movable platform mounted to the inner shell within the cabinet. The movable platform is configured to move along the vertical direction between a bottom position wherein the movable platform is at least partially flush with a bottom wall of the inner shell and an elevated position wherein the movable platform is positioned above the bottom wall of the inner shell.

In another exemplary aspect of the present disclosure, a cooking appliance is provided. The cooking appliance includes a cabinet that defines a vertical direction, a lateral direction, and a transverse direction. The vertical direction, the lateral direction, and the transverse direction are mutually perpendicular. The cooking appliance also includes an inner shell positioned within the cabinet. The inner shell defines a cooking chamber therein. The cooking chamber extends along the transverse direction from an opening at a front end of the cooking chamber to a rear wall of the inner shell. The cooking appliance further includes an upper heating module positioned at or proximate to an upper wall of the inner shell. The cooking appliance also includes a movable platform mounted to the inner shell within the cabinet. The movable platform is configured to move along the vertical direction between a bottom position wherein the movable platform is at least partially flush with a bottom wall of the inner shell and an elevated position wherein the movable platform is positioned above the bottom wall of the inner shell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
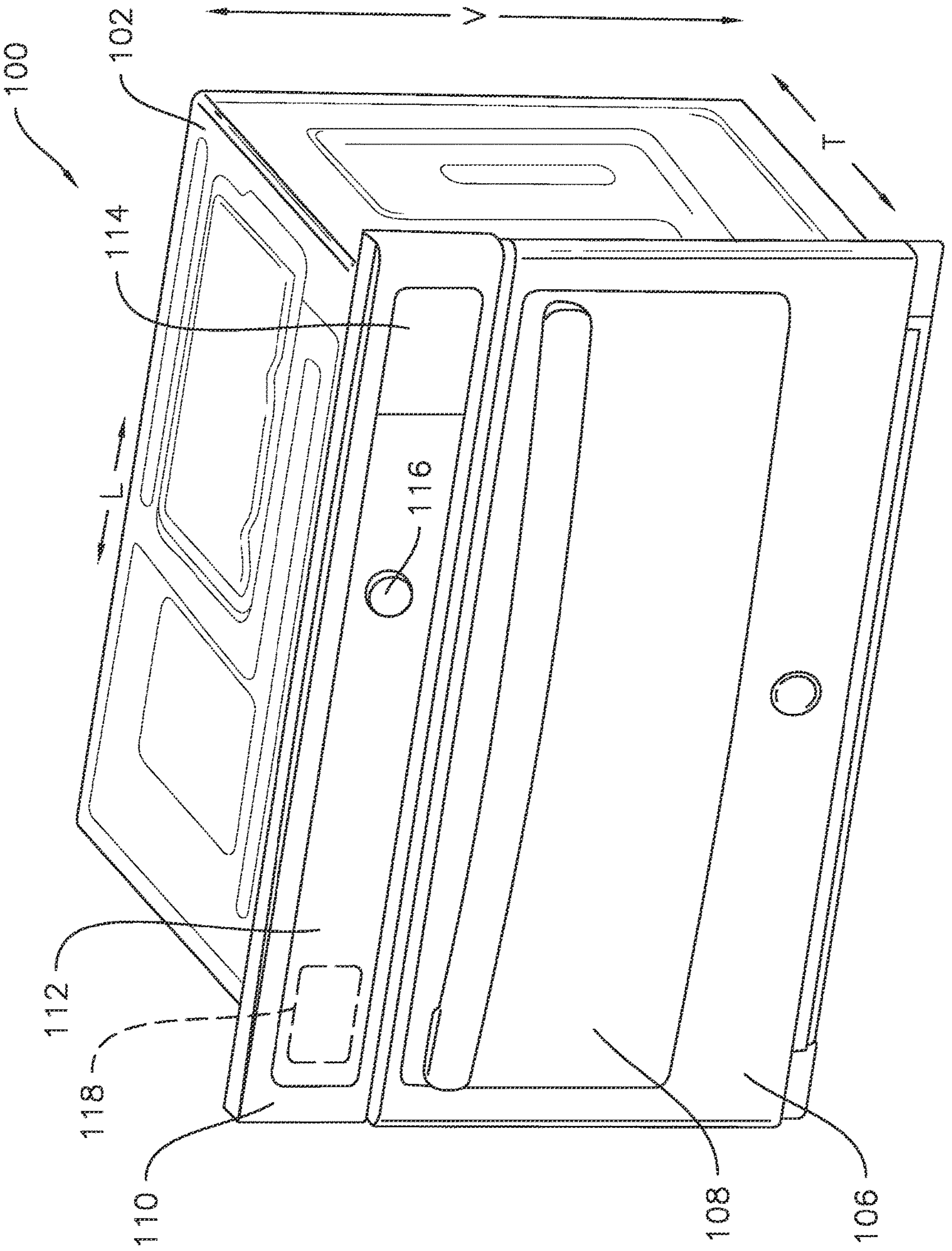
FIG. 1 provides a perspective view of a cooking appliance according to one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term “or” is generally intended to be inclusive (i.e., “A or B” is intended to mean “A or B or both”). The terms “first,” “second,” and “third” may be used interchangeably to distinguish one component from another and are not intended to signify location or importance of the individual components. Furthermore, as used herein, terms of approximation, such as "approximately," "substantially," or "about," refer to being within a ten percent margin of error.

Figure 2:
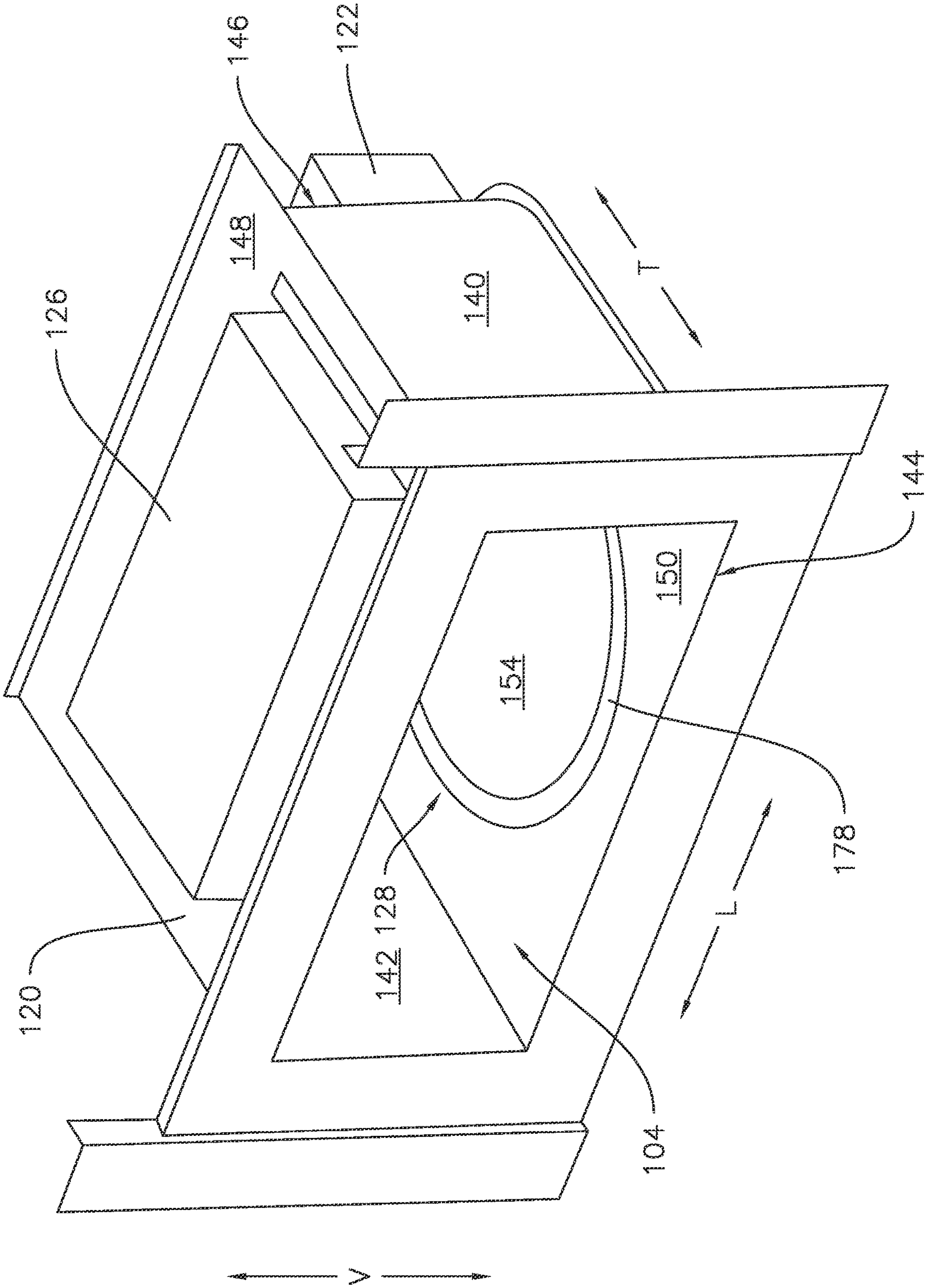
FIG. 2 provides a perspective view of the exemplary cooking appliance of FIG. 1, with a door and outer housing thereof removed to illustrate internal components of the cooking appliance.
Figure 3:
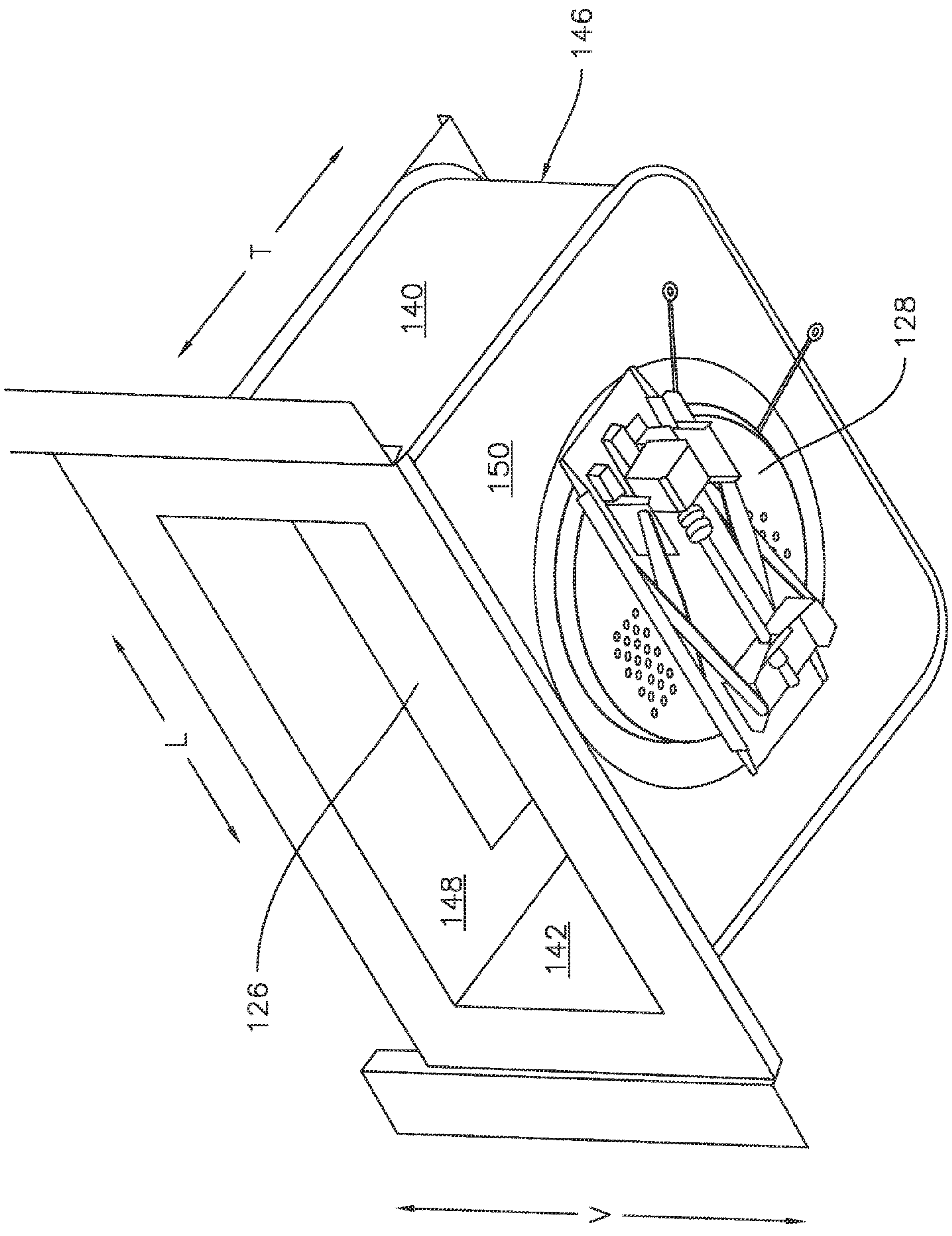
FIG. 3 provides a bottom perspective view of the exemplary cooking appliance of FIG. 2.

Turning now to the figures, FIG. 1 provides a perspective view of a cooking appliance 100 according to exemplary embodiments of the present disclosure. FIGS. 2 and 3 provide additional perspective views of the cooking appliance 100 with the cabinet 102 and door 106 omitted to illustrate internal components of the cooking appliance 100. Generally, cooking appliance 100 includes a housing or cabinet 102 that defines a mutually-orthogonal vertical direction V, lateral direction L, and transverse direction T. Within cabinet 102, cooking appliance 100 defines a cooking chamber 104 (FIGS. 2 and 3) in which food items can be received. In some embodiments, a door 106 is rotatably mounted to the cabinet 102 to move between an open position and a closed position. The open position permits access to cooking chamber 104 while the closed position restricts access to cooking chamber 104. A window 108 in door 106 may be provided (e.g., for viewing food items in the cooking chamber 104). Additionally or alternatively, a handle may be secured to door 106 (e.g., to rotate therewith). The handle can be formed of plastic, for example, and can be injection molded.

In certain embodiments, cooking appliance 100 includes a control panel frame 110 on or as part of cabinet 102. A control panel 112 may be mounted within control panel frame 110. Generally, control panel 112 includes a display device 114 for presenting various information to a user. Control panel 112 may also include one or more input devices (e.g., tactile buttons, knobs, touch screens, etc.). In optional embodiments, the input devices of control panel 112 include a knob or dial 116. Selections may be made by rotating dial 116 clockwise or counter-clockwise, and when the desired selection is displayed, pressing dial 116. For example, many meal cook cycles and other cooking algorithms can be preprogrammed in or loaded onto a memory device of a controller 118 of cooking appliance 100 for many different food items types (e.g., pizza, fried chicken, French fries, potatoes, etc.), including simultaneous preparation of a group of food items of different food types comprising an entire meal. Instructions or selections may be displayed on display device 114. In optional embodiments, display device 114 can be used as an input device. For instance, display device 114 may be a touchscreen device, as is understood by those of ordinary skill in the art.

In exemplary embodiments, cabinet 102 of cooking appliance 100 includes an inner shell 120. Inner shell 120 of cabinet 102 delineates the interior volume of cooking chamber 104. In particular, the inner shell 120 may comprise a plurality of walls which define and delineate the cooking chamber 104, such as a top wall 148 and a bottom wall 150 which are spaced apart along the vertical direction V, a rear wall 146 which is spaced apart from a front opening 144 along the transverse direction T, and a left wall 142 and a right wall 140 which are spaced apart from each other along the lateral direction L. Each wall of the plurality of walls 140, 142, 146, 148, and 150, may be joined to the adjoining walls at corresponding edges thereof, e.g., the bottom edge of the left wall 142 is joined to the left edge of the bottom wall 150, the bottom edge of the rear wall 146 is joined to the rear edge of the bottom wall 150 and the left edge of the rear wall 136 is joined to the rear edge of the left wall 142, and so forth. Continuing the example, the top edges of the left, right, and rear walls 142, 140, 146 may each be joined to the left, right, and rear edges, respectively, of the top wall 148, etc. Optionally, the walls of shell 120 may be constructed using high reflectivity (e.g., 72% reflectivity) stainless steel.

Thus, in at least some embodiments, the cooking chamber 104 may be defined and bounded by the plurality of walls of the inner shell 120, including the top wall 148 and bottom wall 150. As will be described in more detail below, the cooking appliance 100 may also include multiple cooking modules. For example, the cooking appliance 100 may include an upper heating module 126 at or proximate to the top wall 148 of the inner shell 120 and a lower heating module 124 at or proximate to the bottom wall 150. The top wall 148 and the bottom wall 150 may be spaced apart along the vertical direction V by a height of the cooking chamber 104. As used herein, the upper and lower heating modules 126, 124 may be "proximate to" the top wall 148 and bottom wall 150, respectively, when the heating module is spaced apart from the corresponding top wall or bottom wall along the vertical direction V by ten percent of the height of the cooking chamber 104 or less. Additionally, the foregoing discussion of the position of the lower heating module 124 is with reference to the position when the platform 128 is in a bottom position or lowermost position, as will be described in more detail below.

Cooking appliance 100 includes multiple cooking modules. In particular, cooking appliance 100 includes a microwave module 122 mounted to the inner shell 120 at the rear wall 146 of the inner shell 120, a lower heater module 124 (FIG. 7) mounted within the cabinet 102, e.g., mounted to the bottom wall 150 of the inner shell 120, and an upper heater module 126 mounted within cabinet 102, e.g., mounted to the top wall 148 of the inner shell 120 above the cooking chamber 104, as illustrated in FIG. 2. In particular, and as will be described in more detail below, the lower heater module 124 may be mounted to the inner shell 120 via a movable platform 128, e.g., the lower heater module 124 may be positioned within the movable platform 128 and the movable platform 128 may be mounted to the bottom wall 150. In particular, the movable platform 128 may be movably mounted to the bottom wall 150 such that the movable platform 128 is configured to move along the vertical direction V between a bottom position and an elevated position and the lower heater module 124 moves with the movable platform 128.

Generally, the microwave module 122 includes a magnetron mounted within the cabinet 102 (e.g., behind cooking chamber 104 and between the inner shell 120 and the cabinet 102) and in communication (e.g., fluid or transmissive communication) with the cooking chamber 104 to direct microwave radiation or microwaves thereto. In other words, the microwave module 122 delivers microwave radiation into cooking chamber 104, as is understood by those of ordinary skill in the art. Since the structure and function of magnetrons are understood by those of ordinary skill in the art, the magnetron is only illustrated schematically and is not described in further detail herein for the sake of brevity and clarity.

Figure 7:
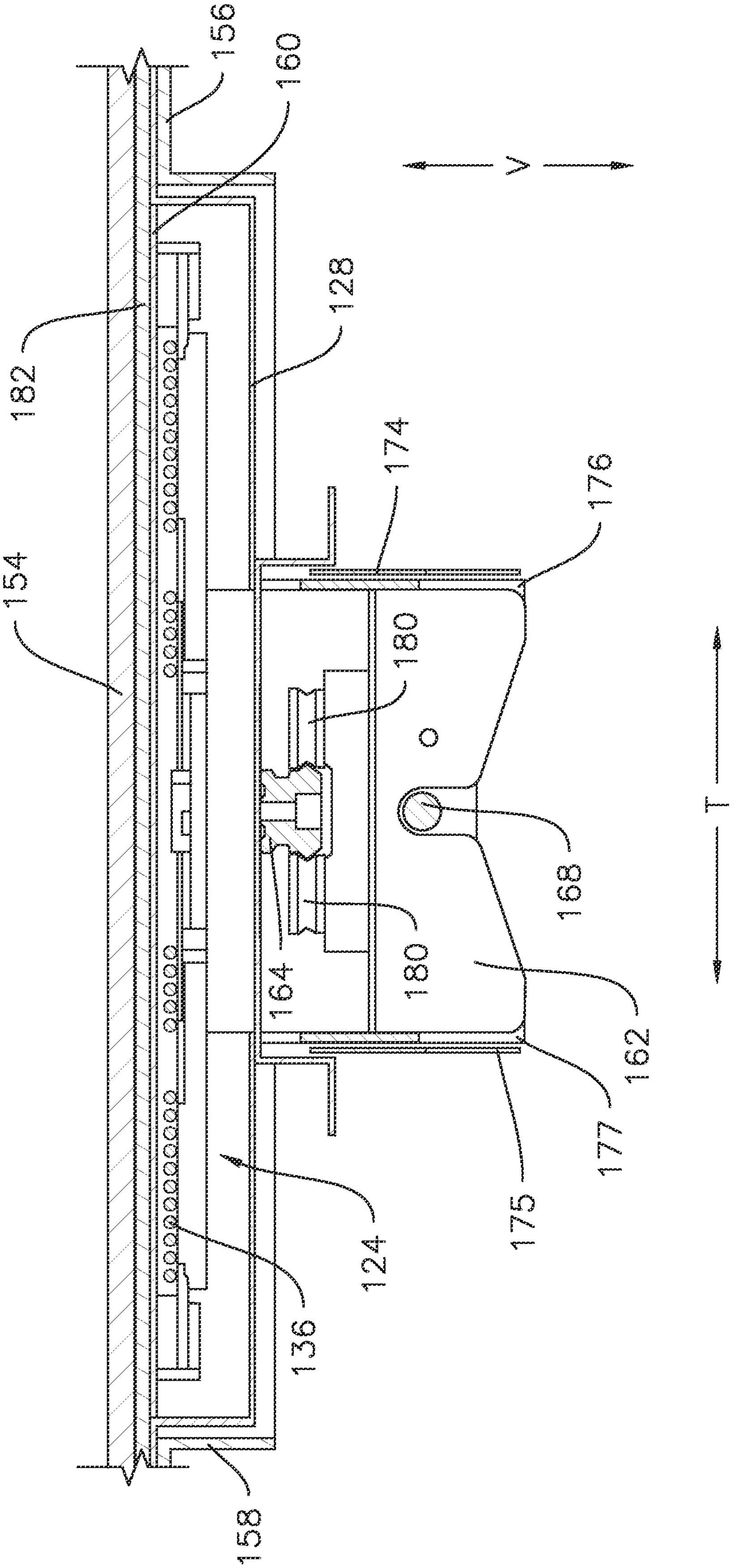
FIG. 7 provides a section view of portions of the exemplary cooking appliance of FIG. 2.

Referring briefly to FIG. 7, the lower heater module 124 may be mounted within cabinet 102. For instance, lower heater module 124 may include an induction heating coil 136 mounted below cooking chamber 104. As will be described in greater detail below, induction heating coil 136 may be in communication (e.g., transmissive communication) with cooking chamber 104 (e.g., through a one-way field filter 160) to direct a magnetic field thereto.

Upper heater module 126 can include one or more heating elements of any suitable types. For instance, upper heater module 126 can include one or more electric heating elements, such as a resistive heating element (e.g., sheathed resistive heater) or a radiant heating element (e.g., a halogen cooking lamp) in thermal communication with cooking chamber 104. In various embodiments, upper heater module 126 may be mounted within or above cooking chamber 104.

The specific heating elements of upper and lower heater modules 126 and 124 can vary from embodiment to embodiment, and the elements and system described above are exemplary only. For example, the upper heater module 126 can include any combination of heaters including combinations of halogen lamps, ceramic lamps, or sheathed heaters. Also by way of example, the lower heater module 124 may include an electric resistance heating element as well as or instead of the induction heating coil 136.

As illustrated in FIG. 1, cooking appliance 100 may include a controller 118. Controller 118 of cooking appliance 100 can include one or more processor(s) and one or more memory device(s). The processor(s) of controller 118 can be any suitable processing device, such as a microprocessor, microcontroller, integrated circuit, or other suitable processing device. The memory device(s) of controller 118 can include any suitable computing system or media, including, but not limited to, non-transitory computer-readable media, RAM, ROM, hard drives, flash drives, or other memory devices. The memory device(s) of controller 118 can store information accessible by the processor(s) of controller 118 including instructions that can be executed by the processor(s) of controller 118 in order to execute various cooking operations or cycles (e.g., a meal cook cycle). Controller 118 is communicatively coupled with various operational components of cooking appliance 100, such as components of upper heater module 126, lower heater module 124, or control panel 112 (e.g., display device 114 or dial 116), the various control buttons, etc. Input/Output ("I/O") signals may be routed between controller 118 and control panel 112 as well as other operational components of cooking appliance 100. Controller 118 can execute and control cooking appliance 100 in various cooking operations or cycles, such as precision cooking, which includes meal cook, microwave, induction, or convection/bake modes.

Turning especially to FIG. 7, a schematic sectional view of the movable platform 128 and the lower heater module 124 therein is provided. In particular, FIG. 7 depicts an exemplary embodiments of the movable platform 128 in the bottom position. As shown, induction heating coil 136 may be mounted below cooking chamber 104. In particular, induction heating coil 136 may be mounted beneath the bottom wall 150 of inner shell 120. In some embodiments, a hole or opening 152 (FIG. 6) is defined through bottom wall 150 (e.g., defining a diameter greater than or equal to a horizontal diameter of induction heating coil 136). Above induction heating coil 136 (e.g., and within cooking chamber 104) a tray or platter 154 may be provided on which a food item may be supported. For induction cooking, the food item may be provided with an induction cooking vessel, as is understood by those of ordinary skill in the art. Controller 118 may be configured to selectively activate induction heating coil 136 to generate a high frequency magnetic field, which may be transmitted through opening 152 to the food item thereabove. Moreover, controller 118 may be configured to selectively activate upper heater module 126 (FIG. 3) to direct heat to the food item.

In certain embodiments, a one-way field filter 160 is provided between induction heating coil 136 and cooking chamber 104. For instance, one-way field filter 160 may be mounted or disposed across opening 152. The filter 160 may permit the magnetic field from the induction coil 136 to pass therethrough into the cooking chamber 104 while preventing or restricting microwave energy passing through the filter 160 to the induction coil 136. One-way field filter 160 may limit or restrict passage of microwave radiation or microwaves while significantly and advantageously permitting the magnetic field. The magnetic field generated by induction heating coil 136 may thus be forced to pass through one-way field filter 160 before entering cooking chamber 104.

Figure 6:
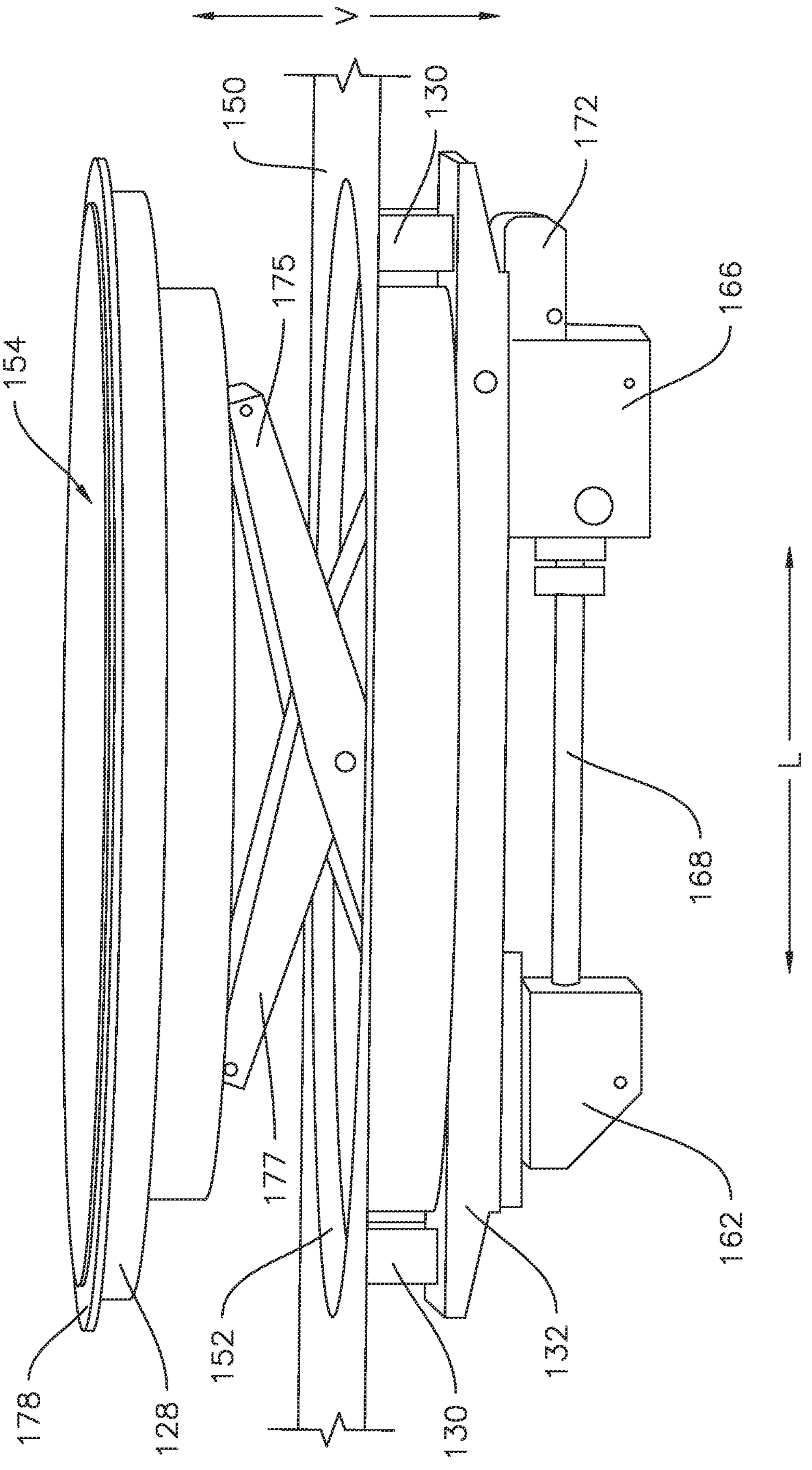
FIG. 6 provides a perspective view of a platform of the exemplary cooking appliance of FIG. 2 in an elevated position.

As mentioned above, the cooking appliance 100 may include a movable platform 128 which is configured to move along the vertical direction V between a bottom position (e.g., FIGS. 2-4) and an elevated position (e.g., FIG. 6). In particular, the movable platform 128 may be at least partially flush with the bottom wall 150 of the inner shell 120 when in the bottom position and the movable platform 128 may be positioned above the bottom wall 150 of the inner shell 120 when in the elevated position. For example, the movable platform 128 may include a flange 178, and the flange 178 may be flush with the bottom wall 150 of the inner shell 120 when the movable platform is in the bottom position, e.g., as best seen in FIG. 2.

Figure 4:
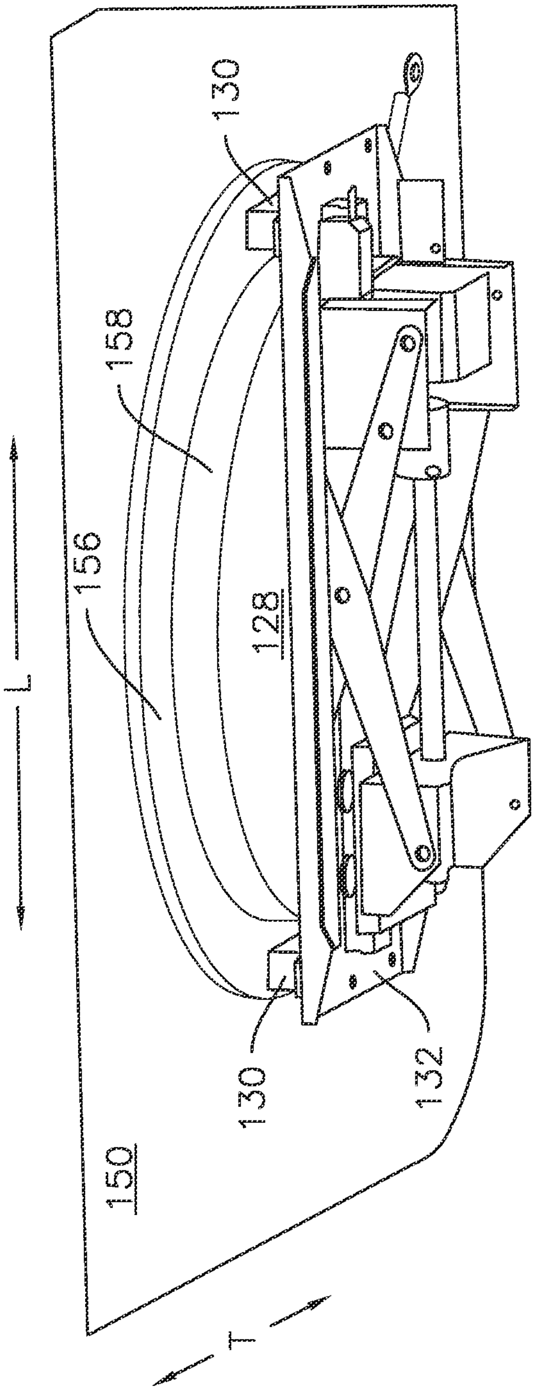
FIG. 4 provides an enlarged bottom perspective view of a portion of the exemplary cooking appliance of FIG. 2.
Figure 5:
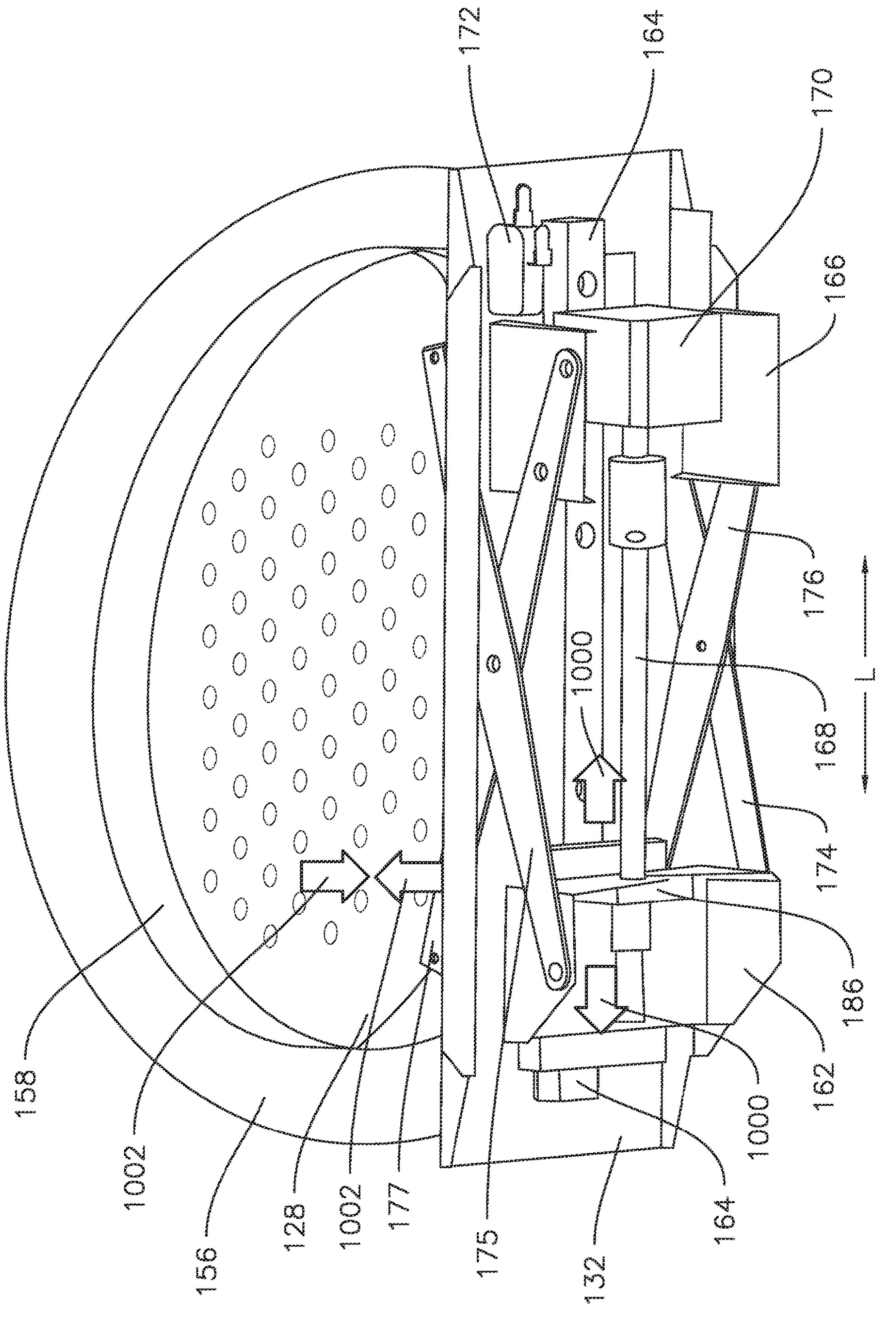
FIG. 5 provides a close-up view of portions of the exemplary cooking appliance of FIG. 2.

As illustrated in FIGS. 4 through 6, the movable platform 128 may be directly coupled to at least one pair of scissor arms. For example, as best seen in FIG. 5, the movable platform 128 may be directly coupled to a top end of a first pair of scissor arms 175 and 177, and to a top end of a second pair of scissor arms 174 and 176. First pair 175, 177 and second pair 174, 176 may be spaced apart along the transverse direction T. The first pair of scissor arms may include an outer scissor arm 175 which is directly coupled and rotatably coupled to a first carriage 162 and an inner scissor arm 177 which is directly coupled and rotatably coupled to a second carriage 166. The second pair of scissor arms may include an outer scissor arm 174 which is directly coupled and rotatably coupled to the first carriage 162 and an inner scissor arm 176 which is directly coupled and rotatably coupled to the second carriage 166.

A hydraulic piston 168 may be coupled to each carriage 162 and 166. In particular embodiments, the hydraulic piston 168 may be coupled to the first carriage 162 at one end and may be coupled to the second carriage 168 via a motor 170 at the other end of the hydraulic piston 168. The motor 170 may be any suitable motor for driving the horizontal, e.g., lateral, movements of the hydraulic piston 168 as will be described below. For example, the motor 170 may be a stepper motor. The motor 170 may be operably coupled to a switch 172, e.g., the switch 172 may be toggled, e.g., by controller 118, to selectively activate or deactivate the motor 170. In some embodiments, the hydraulic piston 168 may extend through a sleeve 186 and the sleeve 186 may be engaged with, e.g., in contact with and bearing against, the first carriage 162. Thus, when the motor 170 is activated, the piston 168 may urge the first carriage 162 along a direction perpendicular to the vertical direction V, such as along the lateral direction L, e.g., as indicated by arrows 1000 in FIG. 5. The scissor arms 174, 175, 176, and 177 mounted to each carriage 162 and 166 may translate the lateral movement of the carriages 162 and 166 into movement along the vertical direction V, e.g., as indicated by arrows 1002 in FIG. 5, thereby moving the movable platform 128 along the vertical direction V, such as between the bottom position and the elevated position.

As best seen in FIGS. 5 and 7, the first carriage 162 and the second carriage 166 may be slidably mounted on a guide rail 164, such as via rollers 180 (FIG. 7). The guide rail 164 may be mounted to a bottom surface of a frame 132. A pair of brackets 130 may be mounted on a top surface of the frame 132 opposite the bottom surface of the frame 132. As may be seen, e.g., in FIG. 4, the bottom wall 150 of the inner shell 120 may include a recess 156, e.g., in which the flange 178 of the movable platform 128 is received when the movable platform 128 is in the bottom position, and a sleeve 158 which extends, e.g., downward along the vertical direction V, from the recess 156. The scissor arms 174, 175, 176, and 177 may extend through the sleeve 158 to connect to the movable platform 128. The frame 132 may be mounted to the bottom wall 150 via the brackets 130, and in some embodiments, the brackets 130 may be directly coupled to the bottom wall 150, such as at the recess 156 as illustrated, e.g., in FIG. 4.

Figure 8:
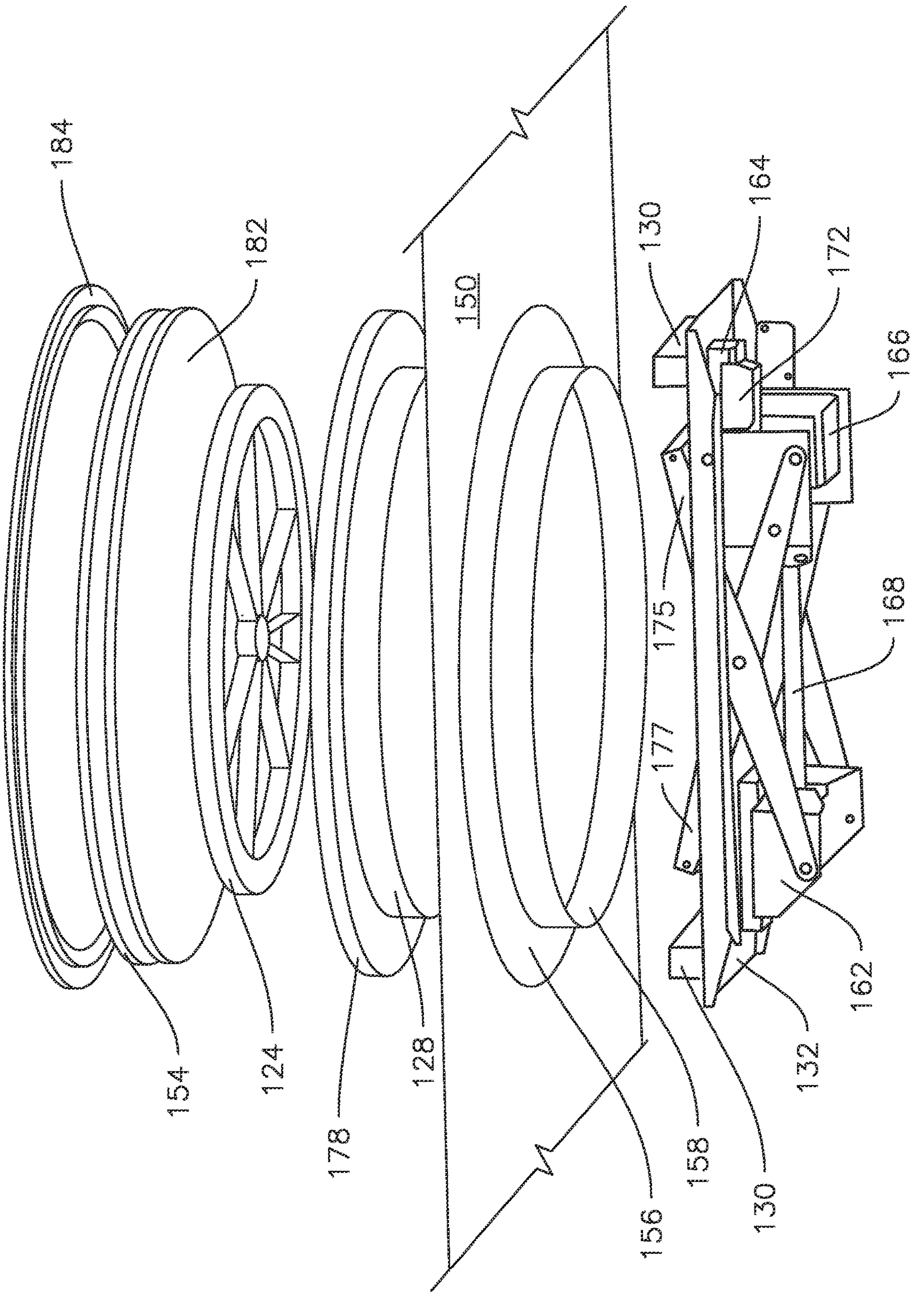
FIG. 8 provides an exploded view of the platform of FIGS. 6 and 7.

Turning now to FIGS. 7 and 8, in some embodiments, the cooking appliance 100 may further include an insulator 182 positioned between the lower heater module 124 and platter 154, such as directly below the platter 154 along the vertical direction V and in contact with the platter 154. A gasket 184 may be disposed around the platter 154, such as to cover and seal a gap between the platter 154 and the bottom wall 150 when the movable platform 128 is in the bottom position. The gasket 184 may also provide sealing between the platter 154 and adjoining portions of the movable platform 128. Thus, the gasket 184 may prevent debris, e.g., crumbs, spilled liquids, and other similar debris, from falling into the movable platform 128 and/or between the movable platform 128 and the bottom wall 150.

In use, a food item and/or a vessel or utensil containing one or more food items may be placed on the movable platform 128, such as on the platter 154 thereof. In some operations, such as where heating of the food item(s) primarily or exclusively by the upper heater module 126 is desired, and/or where a small size or amount of food is being heated, the movable platform 128 may advantageously position the food item(s) on the platter 154 closer to the upper heater module 126, e.g., by moving to the elevated position, whereby the movable platform 128 and any items disposed thereon approach and move closer to the upper heater module 126. In the elevated position, the proximity of the food items to the upper heater module 126 may permit the food items to be heated more rapidly and more efficiently by the upper heater module 126 as compared to when the food items are on or proximate to the bottom wall 150, e.g., when the movable platform 128 is in the bottom position or in cooking appliances which do not include a movable platform.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance comprising:

a cabinet defining a vertical direction;

an inner shell positioned within the cabinet, the inner shell defining a cooking chamber therein;

an upper heating module positioned at or proximate to an upper wall of the inner shell;

a movable platform mounted to the inner shell within the cabinet, the movable platform configured to move along the vertical direction between a bottom position wherein the movable platform is at least partially flush with a bottom wall of the inner shell and an elevated position wherein the movable platform is positioned above the bottom wall of the inner shell;

a hydraulic piston coupled to the movable platform, whereby the hydraulic piston is configured to move the movable platform along the vertical direction between the bottom position and the elevated position; and a guide rail mounted to a bottom surface of a frame.

2. The cooking appliance of claim 1, further comprising a lower heating module positioned within the movable platform, wherein the lower heating module is configured to move with the movable platform along the vertical direction between the bottom position and the elevated position.

3. The cooking appliance of claim 2, wherein the lower heating module comprises an induction heating module.

4. The cooking appliance of claim 1, wherein the movable platform moves along the vertical direction between the bottom position and the elevated position when the hydraulic piston moves along a direction perpendicular to the vertical direction.

5. The cooking appliance of claim 1, wherein the hydraulic piston is coupled to the movable platform by a pair of scissor arms, whereby the scissor arms translate horizontal movement of the hydraulic piston into vertical movement of the movable platform.

6. The cooking appliance of claim 1, wherein the hydraulic piston is coupled to the movable platform via the frame, further comprising a pair of rollers positioned on the frame, wherein the guide rail is positioned between the rollers of the pair of rollers.

7. The cooking appliance of claim 1, further comprising a stepper motor coupled to the hydraulic piston, the stepper motor configured to actuate the hydraulic piston.

8. The cooking appliance of claim 7, wherein the movable platform moves along the vertical direction between the bottom position and the elevated position when the hydraulic piston moves along a direction perpendicular to the vertical direction, and wherein the stepper motor moves the hydraulic piston along the direction perpendicular to the vertical direction.

9. A cooking appliance comprising:

a cabinet defining a vertical direction, a lateral direction, and a transverse direction, the vertical direction, the lateral direction, and the transverse direction being mutually perpendicular;

an inner shell positioned within the cabinet, the inner shell defining a cooking chamber therein, the cooking chamber extending along the transverse direction from an opening at a front end of the cooking chamber to a rear wall of the inner shell;

an upper heating module positioned at or proximate to an upper wall of the inner shell;

a movable platform mounted to the inner shell within the cabinet, the movable platform configured to move along the vertical direction between a bottom position wherein the movable platform is at least partially flush with a bottom wall of the inner shell and an elevated position wherein the movable platform is positioned above the bottom wall of the inner shell;

a hydraulic piston coupled to the movable platform, whereby the hydraulic piston is configured to move the movable platform along the vertical direction between the bottom position and the elevated position; and a guide rail mounted to a bottom surface of the movable platform.

10. The cooking appliance of claim 9, wherein further comprising a lower heating module positioned within the movable platform, wherein the lower heating module is configured to move with the movable platform along the vertical direction between the bottom position and the elevated position.

11. The cooking appliance of claim 10, wherein the lower heating module comprises an induction heating module.

12. The cooking appliance of claim 9, wherein the movable platform moves along the vertical direction between the bottom position and the elevated position when the hydraulic piston moves along the lateral direction.

13. The cooking appliance of claim 9, wherein the hydraulic piston is coupled to the movable platform by a pair of scissor arms, whereby the scissor arms translate movement of the hydraulic piston along the lateral direction into movement of the movable platform along the vertical direction.

14. The cooking appliance of claim 9, wherein the hydraulic piston is coupled to the movable platform via the frame, further comprising a pair of rollers positioned on the frame, wherein the guide rail is positioned between the rollers of the pair of rollers along the transverse direction.

15. The cooking appliance of claim 9, further comprising a stepper motor coupled to the hydraulic piston, the stepper motor configured to actuate the hydraulic piston.

16. The cooking appliance of claim 15, wherein the movable platform moves along the vertical direction between the bottom position and the elevated position when the hydraulic piston moves along the lateral direction, and wherein the stepper motor moves the hydraulic piston along the lateral direction.

* * * * *